(12) United States Patent
Ichikawa et al.

(10) Patent No.: US 10,020,686 B2
(45) Date of Patent: Jul. 10, 2018

(54) POWER TRANSMISSION SYSTEM

(71) Applicant: Murata Manufacturing Co., Ltd., Nagaokakyo-shi, Kyoto-fu (JP)

(72) Inventors: Keiichi Ichikawa, Nagaokakyo (JP); Tsuyoshi Suesada, Nagaokakyo (JP); Henri Bondar, Kyoto (JP); Hironobu Takahashi, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 180 days.

(21) Appl. No.: 14/993,193

(22) Filed: Jan. 12, 2016

(65) Prior Publication Data
US 2016/0126754 A1 May 5, 2016

Related U.S. Application Data

(63) Continuation of application No. PCT/JP2015/065186, filed on May 27, 2015.

(30) Foreign Application Priority Data

Jun. 6, 2014 (JP) ................................ 2014-117199

(51) Int. Cl.
*H02J 50/12* (2016.01)
*H02J 7/02* (2016.01)
*H02J 5/00* (2016.01)

(52) U.S. Cl.
CPC .............. *H02J 50/12* (2016.02); *H02J 5/005* (2013.01); *H02J 7/025* (2013.01)

(58) Field of Classification Search
CPC ........ B60L 11/00; B60L 11/182; H01F 38/00; H01F 38/14; H02J 17/00; H02J 5/00;
(Continued)

(56) References Cited

U.S. PATENT DOCUMENTS

2010/0244581 A1* 9/2010 Uchida ................... H02J 5/005
                                                              307/104
2013/0082536 A1* 4/2013 Taylor ..................... H02J 7/025
                                                              307/104
(Continued)

FOREIGN PATENT DOCUMENTS

JP         2013078171 A    4/2013
JP         2013-243788 A  12/2013
WO     WO 2013/035392 A   3/2013

OTHER PUBLICATIONS

PCT/JP2015/065186 ISR dated Aug. 6, 2015.
PCT/JP2015/065186 Written Opinion dated Aug. 6, 2015.

*Primary Examiner* — Lincoln Donovan
*Assistant Examiner* — David Mattison
(74) *Attorney, Agent, or Firm* — Arent Fox LLP

(57) ABSTRACT

A power transmission system is disclosed in which power is transmitted from a power transmission apparatus to a power receiving apparatus by electric field coupling between active and passive electrodes. The power transmission apparatus includes a step-up/down circuit for stepping up or down a direct voltage and an inverter circuit for converting the direct voltage into an alternating voltage that is output to the active and passive electrodes. The power transmission apparatus controls the step-up/down circuit to sweep a transformation ratio $M=V_{o1}/V_{in}$ and detects the ratio M when an input power Pin of the step-up/down circuit is a minimum. The power transmission apparatus drives the step-up/down circuit to obtain the ratio M and perform the power transmission. As a result, there is provided a power transmission system capable of efficiently performing power transmission regardless of the change in a load in the power receiving apparatus.

20 Claims, 13 Drawing Sheets

(58) Field of Classification Search
CPC .. H02J 5/005; H02J 50/00; H02J 50/12; H02J 7/00; H02J 7/025
USPC ........................................................ 307/104
See application file for complete search history.

(56) References Cited

U.S. PATENT DOCUMENTS

2013/0082648 A1    4/2013  Kamata
2013/0334893 A1*  12/2013  Takahashi ............... H02J 17/00
                                                          307/104
2014/0028093 A1*   1/2014  Aikawa .................. H02J 7/025
                                                          307/11

* cited by examiner

POWER TRANSMISSION SYSTEM

CROSS REFERENCE TO RELATED APPLICATIONS

The present application is a continuation of PCT/JP2015/065186 filed May 27, 2015, which claims priority to Japanese Patent Application No. 2014-117199, filed Jun. 6, 2014, the entire contents of each of which are incorporated herein by reference.

FIELD OF THE INVENTION

The present invention relates to a power transmission system in which power is transmitted from a power transmission apparatus to a power receiving apparatus.

BACKGROUND OF THE INVENTION

In power transmission systems, electric field coupling or magnetic field coupling between a power transmission apparatus and a power receiving apparatus is provided for transmitted power from the power transmission apparatus to the power receiving apparatus. In general, incorporating a low-loss resonance circuit into a power transmission apparatus and a power receiving apparatus is an effective way to improve transmission efficiency of a power transmission system. In a case where power is transmitted from a power source in the power transmission apparatus to a load in the power receiving apparatus via the resonance circuits, a load resistance is present for maximizing efficiency. In general, the setting of the load resistance is performed so that efficiency is maximized near rated power (for example, 30 W). However, when it is unknown that the load or the impedance of the load is variable, the efficiency decreases at a load other than a rated load.

Patent Document 1 discloses a resonance type non-contact power feeding system capable of efficiently and stably feeding power. In the resonance type non-contact power feeding system disclosed in Patent Document 1, a power receiving apparatus has a function of setting a load resistance for maximization of efficiency.

PTL 1: Japanese Unexamined Patent Application Publication No. 2013-078171.

However, in a case where a power receiving apparatus is a mobile electronic apparatus for which miniaturization and thinning are expected, the addition of a special feature to the mobile electronic apparatus may inhibit the miniaturization and thinning.

SUMMARY OF THE INVENTION

It is an object of the present invention to provide a power transmission system capable of efficiently performing power transmission regardless of a load change in a power receiving apparatus.

A power transmission system according to the present invention includes a power transmission apparatus and a power receiving apparatus. The power transmission apparatus includes a transmission-side coupling component, a transmission-side resonance circuit that is connected to the transmission-side coupling component or includes the transmission-side coupling component, a power conversion circuit configured to convert a direct voltage into an alternating voltage and output the alternating voltage to the transmission-side resonance circuit, an output power setting section configured to set output power of the power conversion circuit, and a driving control section configured to drive and control the power conversion circuit so that the power conversion circuit outputs the output power set by the output power setting section. The power receiving apparatus includes a receiving-side coupling component, a receiving-side resonance circuit that is connected to the receiving-side coupling component or includes the receiving-side coupling component and is configured to resonate at the same resonance frequency as that of the transmission-side resonance circuit, and a constant load power output circuit that is connected to the receiving-side resonance circuit and is configured to convert a voltage induced by the receiving-side coupling portion into a voltage of a predetermined value and output the converted voltage to a load. The output power setting section or controller includes a frequency setting unit configured to set a frequency of the alternating voltage to a frequency determined in accordance with a resonance frequency of the transmission-side resonance circuit and a resonance frequency of the receiving-side resonance circuit, an output power change unit configured to change output power of the power conversion circuit at the frequency set by the frequency setting unit, an input power detection unit configured to detect input power of the power conversion circuit when the output power of the power conversion circuit is changed, and a minimum value detection unit configured to detect a minimum value of the input power detected by the input power detection unit. When an electric field coupling or a magnetic field coupling between the transmission-side coupling portion and the receiving-side coupling portion is provided, power is transmitted from the power transmission apparatus to the power receiving apparatus. Output power corresponding to the input power having the minimum value detected by the minimum value detection unit is set as output power of the power conversion circuit.

With this configuration, the power transmission apparatus minimizes input power of the power conversion circuit and performs power transmission regardless of load conditions in the power receiving apparatus. In a case where high power is always input and power transmission is performed, a loss increases and transmission efficiency decreases. By performing power transmission with the minimum input power regardless of load conditions in the power receiving apparatus, such a problem can be solved and power transmission can be performed with high efficiency. By performing control processing so that input power becomes a minimum in the power transmission apparatus, the need to dispose a special circuit in the power receiving apparatus is eliminated. The miniaturization and thinning of the power receiving apparatus can be therefore achieved.

When a constant voltage is input into the power conversion circuit, the input power detection unit preferably detects an input current of the power conversion circuit and the minimum value detection unit preferably detects a minimum value of the input current detected by the input power detection unit.

With this configuration, since the input voltage of the power conversion circuit is constant, the minimum value of input power of the power conversion circuit can be detected by detecting the minimum value of the input current of the power conversion circuit. In this case, there is no need to perform power computation processing. This leads to the simplification of processing.

The power conversion circuit preferably includes a voltage transforming circuit configured to perform step-up, step-down, or both of step-up and step-down of a direct voltage and an inverter circuit that is connected to the voltage transforming circuit and is configured to convert the direct voltage processed by the transforming circuit into an alternating voltage. The driving control section preferably drives the voltage transforming circuit for step-up or step-down of the direct voltage or controls the inverter circuit.

With this simple configuration, input power can be minimized.

The power transmission apparatus preferably further includes a voltage detection circuit configured to detect an input voltage and an output voltage of the voltage transforming circuit. The output power change unit preferably changes a transformation ratio between the input voltage and the output voltage of the voltage transforming circuit.

With this simple configuration, input power can be minimized by adjusting the transformation ratio.

When the output power setting section repeatedly sets output power of the power conversion circuit, the output power change unit preferably calculates input power from an input voltage and an input current of the voltage transforming circuit at the time of the last setting of output power of the power conversion circuit, sets an initial value based on a square root of the input power for the transformation ratio, and changes the transformation ratio from the initial value.

With this configuration, when the output power of the power conversion circuit is repeatedly set, the setting of an initial value of the transformation ratio can shorten a time taken for the following setting of output power of the power conversion circuit.

The output power change unit preferably changes an on-duty ratio or a pulse density of the inverter circuit.

With this configuration, there is no need to dispose a voltage transforming circuit for performing the step-up, step-down, or both of them of a direct voltage. A circuit configuration can be therefore simplified.

The power receiving apparatus preferably further includes an input voltage detection circuit configured to detect an input voltage of the constant load power output circuit and an error signal transmission circuit configured to, when the input voltage detected by the input voltage detection circuit is less than a threshold value, transmit an error signal to the power transmission apparatus.

With this configuration, the occurrence of the lack of a voltage in the power receiving apparatus can be prevented.

According to the present invention, it is possible to improve power transmission efficiency by processing in a power transmission apparatus without providing, for example, a special circuit in a power receiving apparatus.

DETAILED DESCRIPTION OF THE EXEMPLARY EMBODIMENTS

First Embodiment

Figure 1:
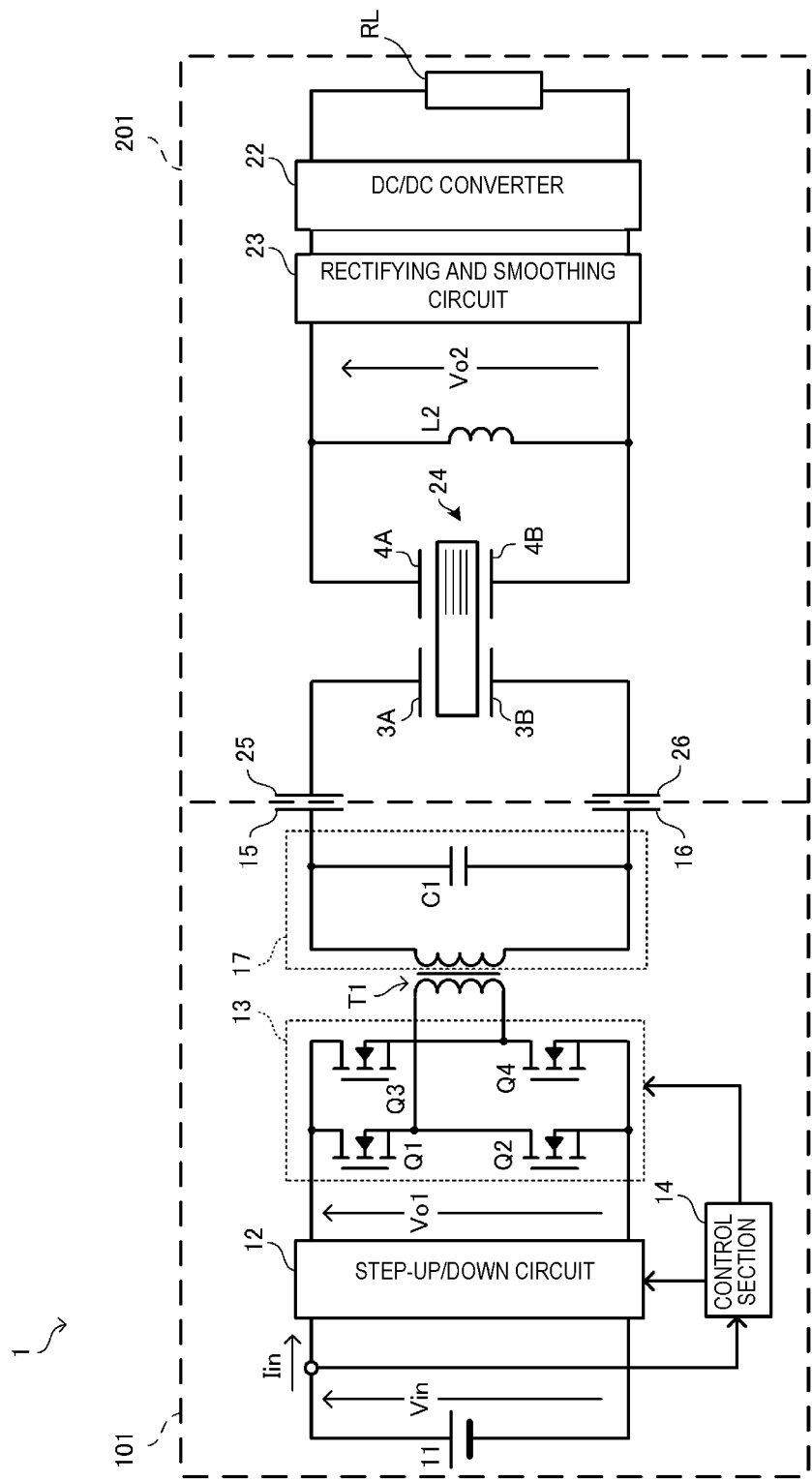
FIG. 1 is a circuit diagram of a power transmission system according to a first embodiment.
Figure 2:
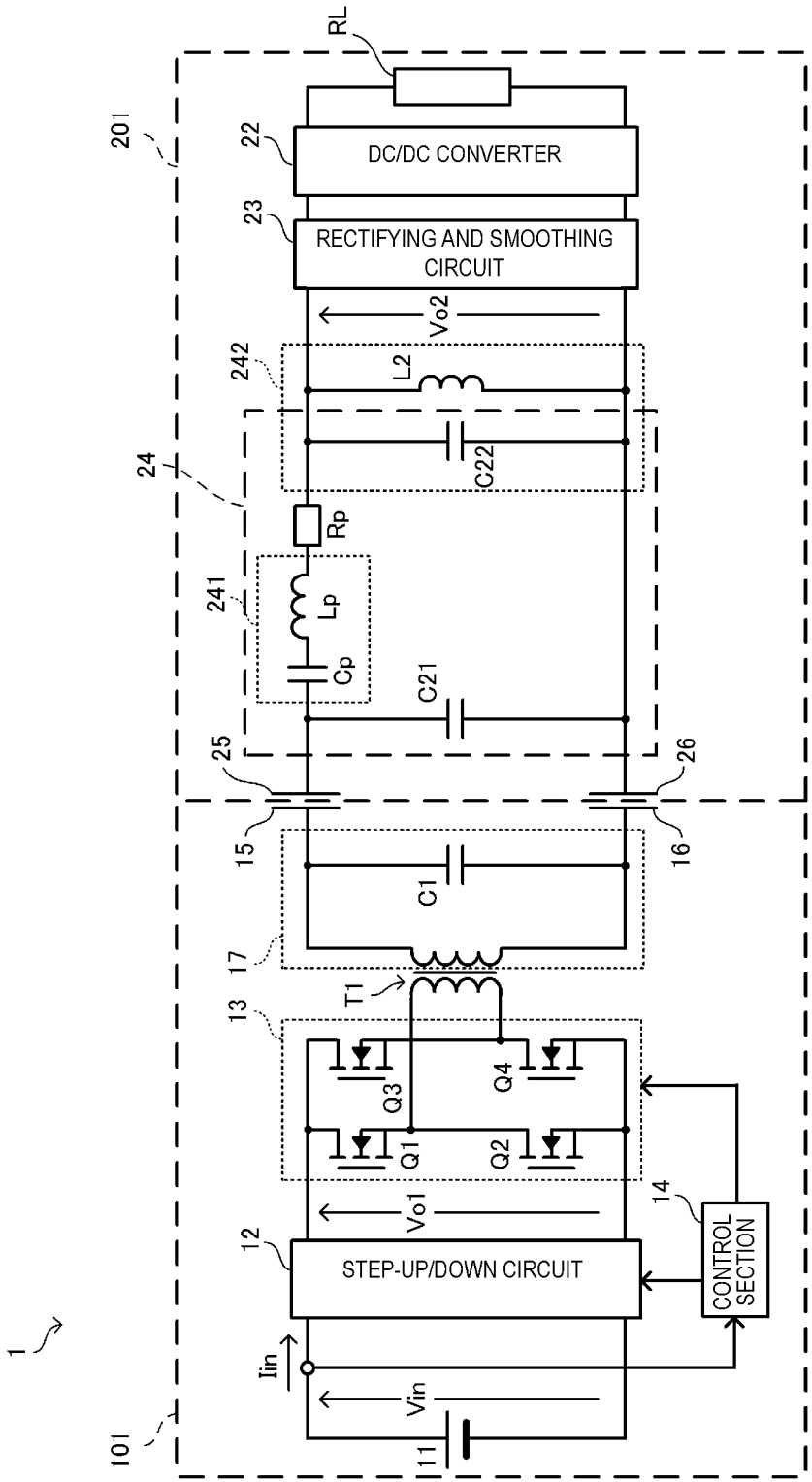
FIG. 2 is an equivalent circuit diagram of the power transmission system illustrated in FIG. 1.

FIG. 1 is a circuit diagram of a power transmission system 1 according to a first embodiment. FIG. 2 is an equivalent circuit diagram of the power transmission system 1 illustrated in FIG. 1.

A power transmission system 1 according to this embodiment includes a power transmission apparatus 101 and a power receiving apparatus 201. The power receiving apparatus 201 includes a load circuit RL. The load circuit RL includes a charging circuit and a secondary battery. The power receiving apparatus 201 is, for example, an mobile electronic apparatus including the secondary battery. Examples of the mobile electronic apparatus include a cellular phone, a portable music player, a notebook personal computer (PC), and a digital camera. The power transmission apparatus 101 is a charging cradle used to charge the secondary battery in the power receiving apparatus 201 placed thereon.

The power transmission apparatus 101 includes a direct-current power source 11 for outputting a direct voltage. The direct-current power source 11 is an AC adaptor connected to a commercial power source.

A step-up/down circuit 12 is connected to the direct-current power source 11. The step-up/down circuit 12 steps up or down a direct voltage supplied from the direct-current power source 11. A direct voltage output from the direct-current power source 11, that is, a voltage input into the step-up/down circuit 12, is hereinafter represented by Vin. The step-up/down circuit 12 corresponds to a "voltage transforming circuit" according to the present invention.

An inverter circuit 13 is connected to the step-up/down circuit 12. A voltage stepped up or down by the step-up/down circuit 12 is input into the inverter circuit 13. An output voltage of the step-up/down circuit 12 is hereinafter represented by Vo1. The output voltage Vo1 is also an input voltage of the inverter circuit 13. The inverter circuit 13 includes MOS-FET switching elements Q1, Q2, Q3, and Q4. In the inverter circuit 13, the switching elements Q1 and Q2 are connected in series, and the switching elements Q3 and Q4 are connected in series. A node between the switching elements Q1 and Q2 and a node between the switching elements Q3 and Q4 are connected to the primary winding of a step-up transformer T1.

The step-up/down circuit 12 and the inverter circuit 13 correspond to a "power conversion circuit" according to the present invention.

Each of the switching elements Q1, Q2, Q3, and Q4 in the inverter circuit 13 is subjected to PWM control performed by a control section 14 or controller to be described later. When the control section 14 alternately turns on and off the switching elements Q1 and Q4 and the switching elements Q2 and Q3, the inverter circuit 13 converts the output voltage Vo1 into an alternating voltage.

The secondary winding of the step-up transformer T1 is connected to an active electrode 15 and a passive electrode 16. The step-up transformer T1 steps up the alternating voltage obtained by the inverter circuit 13 and applies the alternating voltage to the active electrode 15 and the passive electrode 16. The active electrode 15 and the passive electrode 16 are examples of a "transmission-side coupling component" according to the present invention.

A capacitor C1 is connected to the secondary winding of the step-up transformer T1. The secondary winding and the capacitor C1 form a parallel resonance circuit 17. The parallel resonance circuit 17 corresponds to a "transmission-side resonance circuit" according to the present invention.

The power receiving apparatus 201 includes an active electrode 25 and a passive electrode 26. When the power receiving apparatus 201 is placed on the power transmission apparatus 101, the active electrode 25 and the passive electrode 26 face the active electrode 15 and the passive electrode 16 in the power transmission apparatus 101, respectively, with a gap therebetween. When a voltage is applied between the active electrode 15 and the passive electrode 16, electric field coupling is generated between the active electrodes 15 and 25 facing each other and electric field coupling is generated between the passive electrodes 16 and 26 facing each other. The coupling enables the transmission of power from the power transmission apparatus 101 and the power receiving apparatus 201 in a non-contact manner.

The active electrode 25 and the passive electrode 26 corresponds to a "receiving-side coupling component" according to the present invention.

A piezoelectric transformer 24 is connected to the active electrode 25 and the passive electrode 26 in the power receiving apparatus 201. The piezoelectric transformer 24 is provided with a piezoelectric substrate formed of, for example, PZT ceramic. External electrodes 3A and 3B facing each other are positioned at one end of the piezoelectric substrate, and external electrodes 4A and 4B facing each other are positioned at the other end of the piezoelectric substrate. The piezoelectric substrate is polarized. When an alternating voltage is applied between the external electrodes 3A and 3B, vibrations in the length direction of the piezoelectric substrate are excited in the piezoelectric transformer 24 and the entire piezoelectric substrate vibrates. As a result, a stepped-down voltage can be extracted between the external electrodes 4A and 4B.

Referring to FIG. 2, an equivalent circuit of the piezoelectric transformer 24 is illustrated. The piezoelectric transformer 24 is represented with capacitors C21, C22, Cp, an inductor Lp, and a resistor Rp. The capacitor C21 is an equivalent input capacitance of the piezoelectric transformer 24 and is generated between the external electrodes 3A and 3B. The capacitor C22 is an equivalent output capacitance of the piezoelectric transformer 24, and is generated between the external electrodes 4A and 4B. The capacitor Cp and the inductor Lp are parameters corresponding to electromechanical vibrations. Although not illustrated, an ideal transformer is formed between the resistor Rp and the capacitor C22 illustrated in FIG. 2.

The resonance frequency of the piezoelectric transformer 24 is determined by the resonance of a series resonance circuit 241 formed of the capacitor Cp and the inductor Lp. A piezoelectric ceramic that elastically vibrates is used in electric energy conversion, and has a natural resonance frequency determined in accordance with the elastic wave propagation velocity and dimensions of the piezoelectric ceramic. The piezoelectric transformer 24 is designed so that the series resonance circuit 241 has the same resonance frequency as the parallel resonance circuit 17 in the power transmission apparatus 101.

An inductor L2 is connected to the output side of the piezoelectric transformer 24. The inductor L2 forms a parallel resonance circuit 242 along with the capacitor C22 that is the equivalent output capacitance of the piezoelectric transformer 24. The circuit constant of the inductor L2 is set so that the parallel resonance circuit 242 has the same resonance frequency as the parallel resonance circuit 17 and the series resonance circuit 241.

The series resonance circuit 241 and the parallel resonance circuit 242 correspond to a "receiving-side resonance circuit" according to the present invention.

A voltage stepped down by the piezoelectric transformer 24 is output to a rectifying and smoothing circuit 23. The rectifying and smoothing circuit 23 includes a diode bridge and a smoothing circuit including a capacitor and an inductor. A DC/DC converter 22 is connected to the rectifying and smoothing circuit 23. The DC/DC converter 22 converts the voltage rectified and smoothed by the rectifying and smoothing circuit 23 into a voltage of a predetermined value and outputs the voltage to the load circuit RL. The DC/DC converter 22 corresponds to a "constant load power output circuit" according to the present invention.

Figure 3:
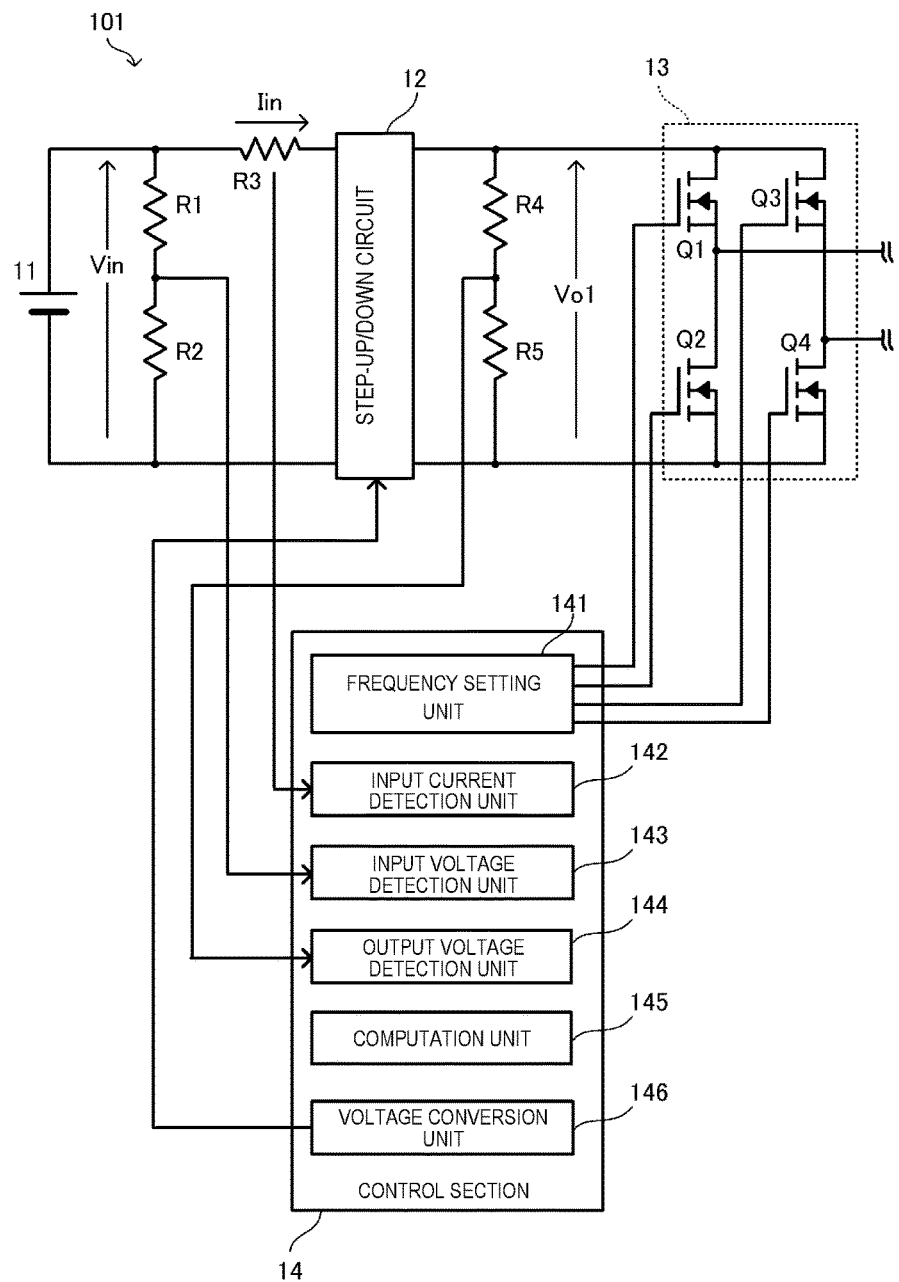
FIG. 3 is a circuit diagram of a power transmission apparatus including a functional block diagram of a control section.

The configuration of the control section 14 in the power transmission apparatus 101 will be described below. FIG. 3 is a circuit diagram of the power transmission apparatus 101 including a functional block diagram of the control section 14 or controller. The control section 14 corresponds to a "controller" or an "output power setting section" and a "driving control section" according to the present invention.

The control section 14 or controller is a control circuit including, for example, a programmed microcomputer or microprocessor. According to the exemplary embodiment, the program causes the control circuit to function as a frequency setting unit 141, an input current detection unit 142, an input voltage detection unit 143, an output voltage detection unit 144, a computation unit 145, and a voltage conversion unit 146.

The frequency setting unit 141 controls the inverter circuit 13 at a predetermined drive frequency. Each of the power transmission apparatus 101 and the power receiving apparatus 201 includes a resonance circuit. When the power receiving apparatus 201 is placed on the power transmission apparatus 101, these resonance circuits perform complex resonance (combination resonance). The frequency setting unit 141 performs frequency sweep to search for a resonance frequency of the complex resonance, uses the resonance frequency as a drive frequency for the driving of the inverter circuit 13, and transmits power to the power receiving apparatus 201. As a result, the transmission of power from the power transmission apparatus 101 to the power receiving apparatus 201 can be performed at a frequency at which good power transmission efficiency is obtained. An algorithm for performing the frequency sweep will be described below in accordance with exemplary embodiments.

The input current detection unit 142 detects an input current Iin to be input into the step-up/down circuit 12. More specifically, a resistor R3 used for the detection of a current is connected between the direct-current power source 11 and the step-up/down circuit 12, and the input current detection unit 142 detects the input current Iin to be input into the step-up/down circuit 12 by detecting a dropped voltage of the resistor R3. The input current detection unit 142 corresponds to an "input power detection unit" according to the present invention.

The input voltage detection unit 143 detects an input voltage Vin to be input into the step-up/down circuit 12. The input voltage detection unit 143 detects the input voltage Vin by detecting a voltage divided by resistors R1 and R2. In this embodiment, the input voltage Vin is constant.

The output voltage detection unit 144 detects an output voltage Vo1 of the step-up/down circuit 12. The output voltage detection unit 144 detects the output voltage Vo1 of the step-up/down circuit 12 by detecting a voltage divided by resistors R4 and R5.

The computation unit 145 performs various required computations. For example, the computation unit 145 derives input power Pin to be input into the step-up/down circuit 12 from the input current Iin and the input voltage Vin. Furthermore, the computation unit 145 calculates a transformation ratio M (=Vo1/Vin) of the step-up/down circuit 12 on the basis of the voltages Vin and Vo1.

The voltage conversion unit 146 corresponds to an "output power change unit" according to the present invention. The voltage conversion unit 146 controls the step-up/down circuit 12 to step up or down the input voltage Vin. By stepping up or down the input voltage Vin under the control of the voltage conversion unit 146, the transformation ratio M can be increased or reduced (swept). In the case of Vin=Vo1, the transformation ratio M is "1". In a case where the step-up/down circuit 12 steps up the input voltage Vin, M>1 is established. In a case where the step-up/down circuit 12 steps down the input voltage Vin, M<1 is established.

The input power Pin is changed by the sweep of the transformation ratio M. The computation unit 145 derives the minimum value of the changeable input power Pin. The computation unit 145 computes the minimum value of the input power Pin on the basis of the amount of change dM in the transformation ratio M and the amount of change dPin in the input power Pin at the time of sweep of the transformation ratio M. The computation unit 145 corresponds to a "minimum value detection unit" according to the present invention.

Figure 4:
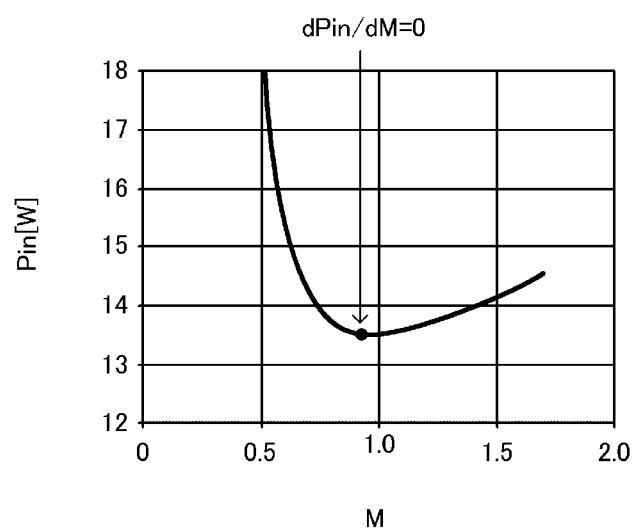
FIG. 4 is a graph representing the relationship between a transformation ratio and input power.

FIG. 4 is a graph representing a relationship between the transformation ratio M and the input power Pin. Referring to FIG. 4, a graph obtained when the input power of the load circuit RL is 12 W is illustrated.

Referring to the graph in FIG. 4, at a position where a gradient is 0, the minimum value of the input power Pin is obtained. Accordingly, based on the amount of change dM in the transformation ratio M and the amount of change dPin in the input power Pin at the time of sweep of the transformation ratio M, the computation unit 145 can compute dPin/dM. Each time the voltage conversion unit 146 steps up or down the output voltage Vo1, the computation unit 145 computes dPin/dM, and derives the input power Pin at the time of dPin/dM=0 as the minimum value.

The voltage conversion unit 146 sweeps the transformation ratio M so that the input power Pin becomes a minimum based on the result of computation of the computation unit 145. For example, in a case where a result of computation of the computation unit 145 is dPin/dM<0, the voltage conversion unit 146 causes the step-up/down circuit 12 to perform a step-up operation to increase the transformation ratio M. In a case where a result of computation of the computation unit 145 is dPin/dM>0, the voltage conversion unit 146 causes the step-up/down circuit 12 to perform a step-down operation to reduce the transformation ratio M. By repeatedly performing this processing, the voltage conversion unit 146 brings the value of dPin/dM closer to 0.

When the transformation ratio M becomes small (is closer to 0.5 in FIG. 4), the input power Pin markedly increases and the input voltage of the power receiving apparatus 201 decreases. When power transmission is performed at a rated load, a load resistance obtained when a load side is viewed from the output of the piezoelectric transformer 24 in the power receiving apparatus 201 is lower than a load resistance required to efficiently operate the piezoelectric transformer 24. That is, the coupling between the piezoelectric transformer 24 and the load circuit RL is weakened and the vibration velocity of the piezoelectric transformer 24 becomes excessive. Accordingly, in a case where the transformation ratio M is swept, it is desired that the transformation ratio M be swept within a predetermined range so as not to make the input power Pin too high. For example, it is desired that the transformation ratio M be swept within the range of dPin/dM≥0.

The voltage conversion unit 146 sets the transformation ratio M with which the input power Pin becomes a minimum as a control parameter for the step-up/down circuit 12, and drives and controls the step-up/down circuit 12 to obtain the set transformation ratio M. Consequently, the input power Pin of the step-up/down circuit 12 becomes small and then power transmission is performed.

Each time the load conditions of the load circuit RL change, the computation unit 145 and the voltage conversion unit 146 detect the transformation ratio M with which the input power Pin becomes a minimum and the voltage conversion unit 146 sets the detected transformation ratio M as a control parameter for the step-up/down circuit 12. That is, regardless of the load conditions of the load circuit RL, power transmission is performed in a state where the input power Pin is always a minimum. As a result, a load resistance viewed from the piezoelectric transformer 24 in the power receiving apparatus 201 and the loss of the DC/DC converter 22 are optimized. That is, there is no need to take the efficiency characteristics of the DC/DC converter 22 into consideration, and it is possible to improve power transmission efficiency on the basis of only the response of the input power Pin.

Figure 5:
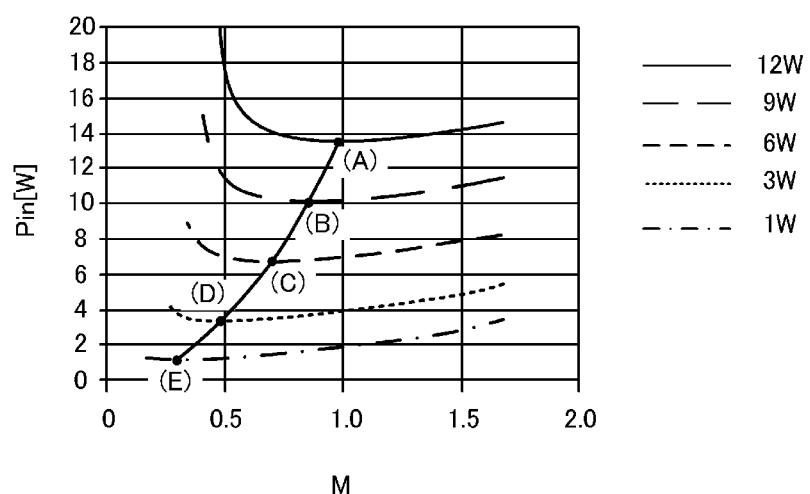
FIG. 5 is a graph representing a relationship between a transformation ratio M and input power when load conditions are changed.
Figure 6:
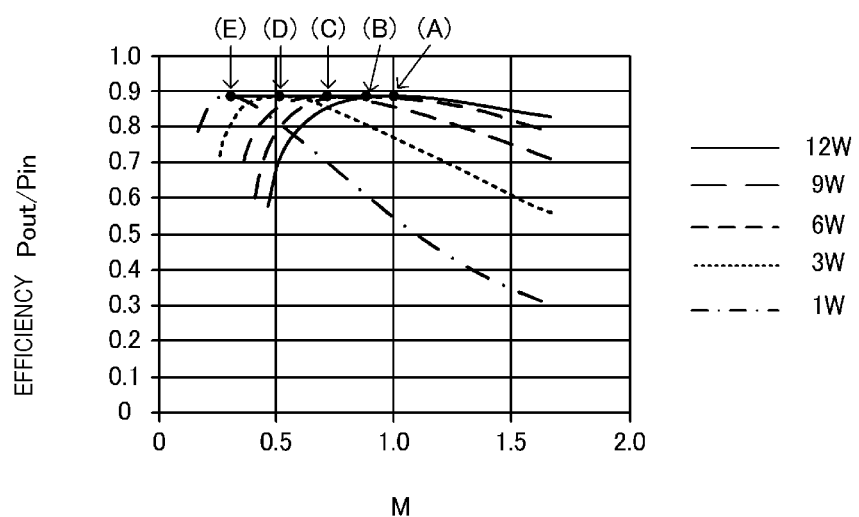
FIG. 6 is a graph representing a relationship between a transformation ratio and power transmission efficiency when load conditions are changed.

FIG. 5 is a graph illustrating the relationship between the transformation ratio M and the input power Pin when load conditions are changed. FIG. 6 is a graph illustrating the relationship between the transformation ratio M and the power transmission efficiency when load conditions are changed.

FIGS. 5 and 6 illustrate graphs when the input power of the load circuit RL is 12 W, 9 W, 6 W, 3 W, and 1 W. In the graph in FIG. 5, a horizontal axis represents the transformation ratio M and the vertical axis represents the input power Pin. In the graph in FIG. 6, the horizontal axis represents a transformation ratio and the vertical axis represents efficiency (power transmission efficiency). Efficiency is Pout/Pin in which Pout represents the input power of the load circuit RL. Points (A) to (E) in FIG. 6 correspond to points (A) to (E) in FIG. 5, respectively. By performing power transmission using the transformation ratio M with which the input power Pin becomes a minimum illustrated in FIG. 5, power transmission efficiency can be kept high as illustrated in FIG. 6.

Figure 7:
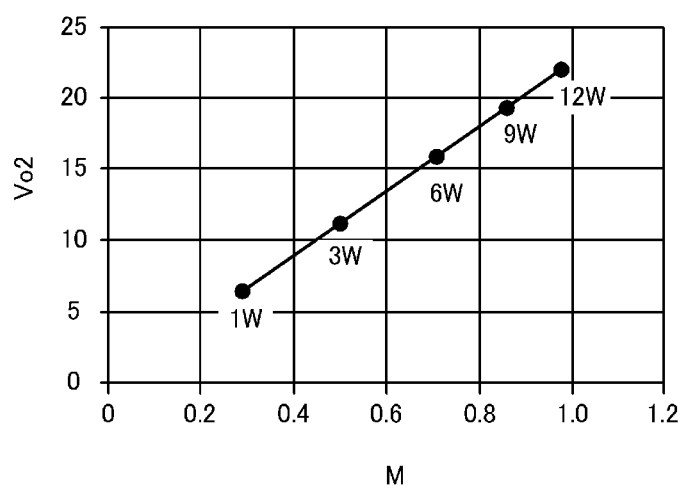
FIG. 7 is a graph representing a relationship between a transformation ratio with which input power becomes a minimum and an output voltage.

FIG. 7 is a graph illustrating the relationship between the transformation ratio M with which the input power Pin becomes a minimum and an output voltage Vo2. As illustrated in FIGS. 1 and 2, the output voltage Vo2 is the output voltage of the piezoelectric transformer 24.

As illustrated in the graph in FIG. 7, the transformation ratio M and the output voltage Vo2 are substantially in proportion to each other. As described previously, the power transmission apparatus 101 and the power receiving apparatus 201 in the power transmission system 1 have respective resonance circuits having the same resonance frequency. In this case, in a resonance system of the power transmission system 1, a load resistance obtained when the side of the power receiving apparatus 201 is viewed from the power transmission apparatus 101 is determined by the resonance circuits. By keeping the load resistance constant regardless of the load conditions of the load circuit RL, power transmission efficiency can be maximized.

The transformation ratio M is obtained from M=Vo1/Vin and the input power Pin is obtained from Pin=Vin*Iin. Accordingly, M=Vo1*Iin/Pin is derived. Since the transformation ratio M and the output voltage Vo2 are in proportion to each other and the transformation ratio M can be represented as above, the output voltage Vo2 and the input current Iin are also in proportion to each other. That is, regardless of the load conditions of the load circuit RL, a load resistance is constant. By performing power transmission in a state where the input power Pin is a minimum regardless of the load conditions of the load circuit RL, power transmission efficiency can be always maximized.

Figure 8:
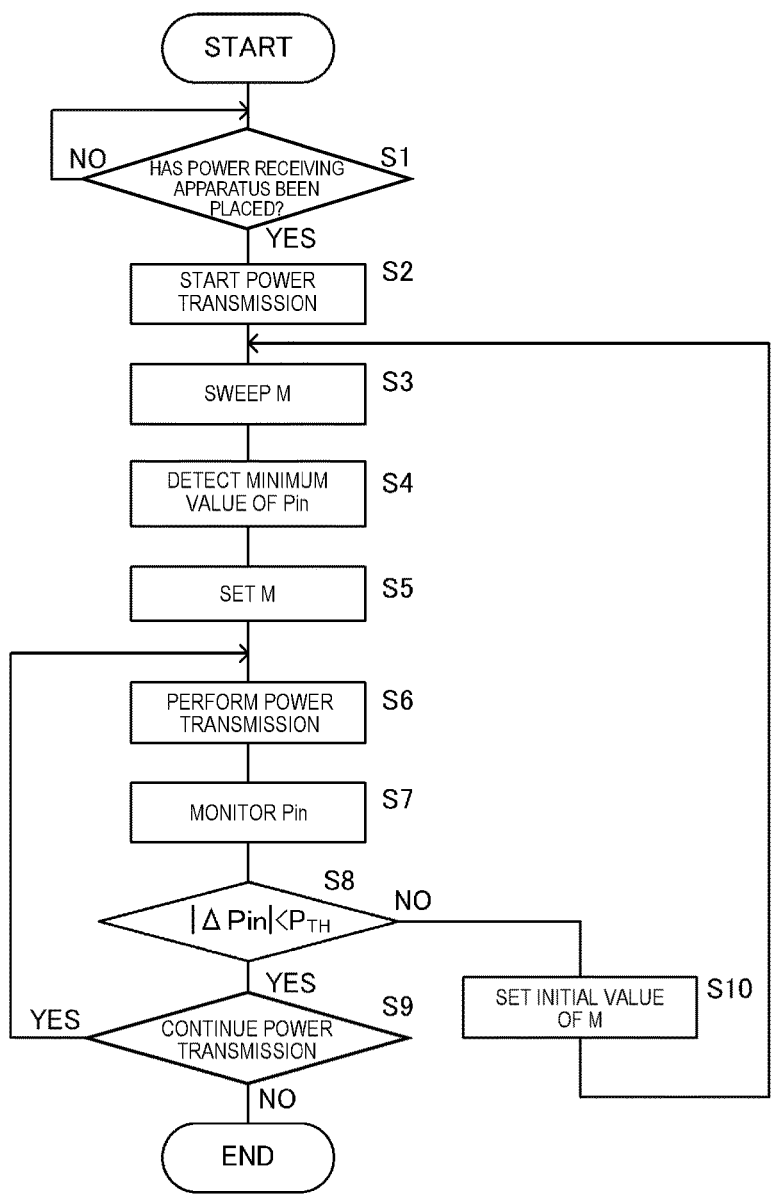
FIG. 8 is a flowchart illustrating an operation of the control section.

Next, the operation of the control section 14 will be described. FIG. 8 is a flowchart illustrating the operation of the control section 14.

As shown, the control section 14 determines whether the power receiving apparatus 201 has been placed on the power transmission apparatus 101 (step S1). In this processing, the frequency setting unit 141 performs PWM control upon the switching elements Q1 to Q4 in the inverter circuit 13 to sweep the drive frequency of the inverter circuit 13. The control section 14 detects the placement of the power receiving apparatus 201 by detecting resonance through the frequency sweep. When the control section 14 does not detect the placement of the power receiving apparatus 201 (No in step S1), the control section 14 can repeatedly perform the processing of step S1. When the control section 14 detects the placement of the power receiving apparatus 201 (Yes in step S1), the control section 14 starts power transmission (step S2). At that time, a drive frequency for power transmission is set to the resonance frequency obtained through the frequency sweep.

Subsequently, the control section 14 sweeps the transformation ratio M (step S3) and detects the minimum value of the input power Pin (step S4). More specifically, as described above, the voltage conversion unit 146 sweeps the transformation ratio M. The computation unit 145 computes dPin/dM in which dM represents the amount of change in the transformation ratio M at the time of the sweep and dPin represents the amount of change in the derived input power Pin. A point at which dPin/dM=0 is established is detected.

When the computation unit 145 derives the minimum value of the input power Pin, the voltage conversion unit 146 sets the transformation ratio M having the minimum value as a control parameter for the step-up/down circuit 12 (step S5).

The voltage conversion unit 146 controls the step-up/down circuit 12 to obtain the transformation ratio M set in step S5 and performs power transmission (step S6). The computation unit 145 monitors the input power Pin with the input current Iin detected by the input current detection unit 142 and the input voltage Vin detected by the input voltage detection unit 143 (step S7). The computation unit 145 determines whether ΔPin is in the range of an allowable variation amount $P_{TH}$ (step S8).

Here, ΔPin represents the difference between input powers Pin detected at different times. For example, when input power obtained at the last time of adjustment for the minimum value is represented by Pin' and input power detected after a time Δt is represented by Pin, ΔPin is represented by ΔPin=Pin−Pin'.

When the adjustment of the input power Pin is not performed when the load conditions of the load circuit RL are changed, transmission efficiency decreases. The allowable variation amount $P_{TH}$ is a threshold value used to determine whether the load conditions of the load circuit RL have been changed to such a degree that the adjustment of the input power Pin is needed. The allowable variation amount $P_{TH}$ can be changed as appropriate.

When ΔPin is in the range of the allowable variation amount $P_{TH}$ (Yes in step S8), the computation unit 145 determines that there is no large change in the load conditions and power transmission is continued. The control section 14 determines whether to continue power transmission (step S9). For example, when the power receiving apparatus 201 is detached from the power transmission apparatus 101, power transmission is not continued. When it is determined that power transmission is to be continued (Yes in step S9), the control section 14 performs processing of step S6. When it is determined that power transmission is not to be continued (No in step S9), the control section 14 ends this process.

When ΔPin is not in the range of the allowable variation amount $P_{TH}$ in step S8 (No in step S8), that is, the load conditions have been significantly changed, the computation unit 145 sets an initial value for the transformation ratio M (step S10), and sweeps the transformation ratio M for which the initial value has been set to detect the minimum value of the input power Pin (step S3). The transformation ratio M and the input power Pin are in the relationship of Pin=αM² (α: proportionality constant). When input power obtained at the last time of adjustment for the minimum value is represented by Pin0 and a transformation ratio at that time is represented by M0, the constant α can be represented by α=Pin0/M0². The transformation ratio M for the input power Pin derived in step S7 is M=M0√(Pin/Pin0) and this value is set as the initial value. The control section 14 sweeps the transformation ratio M using the set initial value in step S3. Thus, by setting the initial value of the transformation ratio M on the basis of the last input power Pin when the load conditions are changed, a time taken to adjust the input power Pin after the load conditions have been changed can be shortened.

Figure 9:
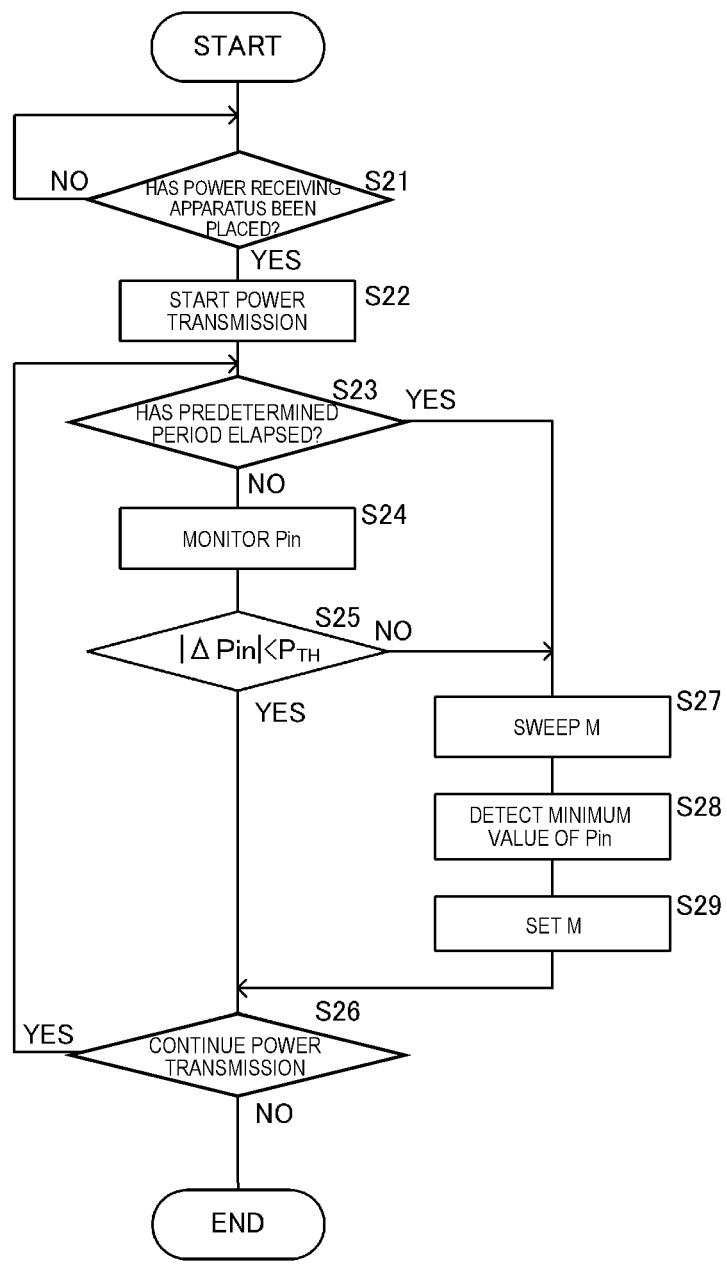
FIG. 9 is a flowchart illustrating another operation of the control section.

FIG. 9 is a flowchart illustrating another operation of the control section 14. As compared with a case illustrated in FIG. 8 in which the adjustment of the transformation ratio M is performed after the start of power transmission, the adjustment of the transformation ratio M is intermittently performed at predetermined time intervals after the start of power transmission in FIG. 9.

As shown, the control section 14 determines whether the power receiving apparatus 201 has been placed on the power transmission apparatus 101 (step S21). When the control section 14 does not detect the placement of the power receiving apparatus 201 (No in step S21), the control section 14 can repeatedly perform the processing of step S21. When the control section 14 detects the placement of the power receiving apparatus 201 (Yes in step S21), the control section 14 starts power transmission (step S22).

The control section 14 determines whether a predetermined period has elapsed (step S23). When the predetermined period has not elapsed (No in step S23), the computation unit 145 monitors the input power Pin with the input current Iin detected by the input current detection unit 142 and the input voltage Vin detected by the input voltage detection unit 143 (step S24). The computation unit 145 determines whether ΔPin is in the range of an allowable variation amount $P_{TH}$ (step S25).

When ΔPin is in the range of the allowable variation amount $P_{TH}$ (Yes in step S25), the computation unit 145 determines that there is no large change in the load conditions and power transmission is continued. The control section 14 determines whether to continue power transmission (step S26). When it is determined that power transmission is to be continued (Yes in step S26), the control section 14 performs processing of step S23. When it is determined that power transmission is not to be continued (No in step S26), the control section 14 ends this process.

When it is determined in step S23 that the predetermined period has elapsed (Yes in step S23) or it is determined in step S25 that ΔPin is not in the range of the allowable variation amount $P_{TH}$ (No in step S25), the control section 14 sweeps the transformation ratio M (step S27) and detects the minimum value of the input power Pin (step S28). When the computation unit 145 derives the minimum value of the input power Pin, the voltage conversion unit 146 sets the transformation ratio M with which the minimum value is obtained as a control parameter for the step-up/down circuit 12 (step S29). Subsequently, the control section 14 performs the processing of step S26.

According to the operation illustrated in FIG. 9, power transmission efficiency can be kept high by periodically adjusting the transformation ratio M.

Figure 10:
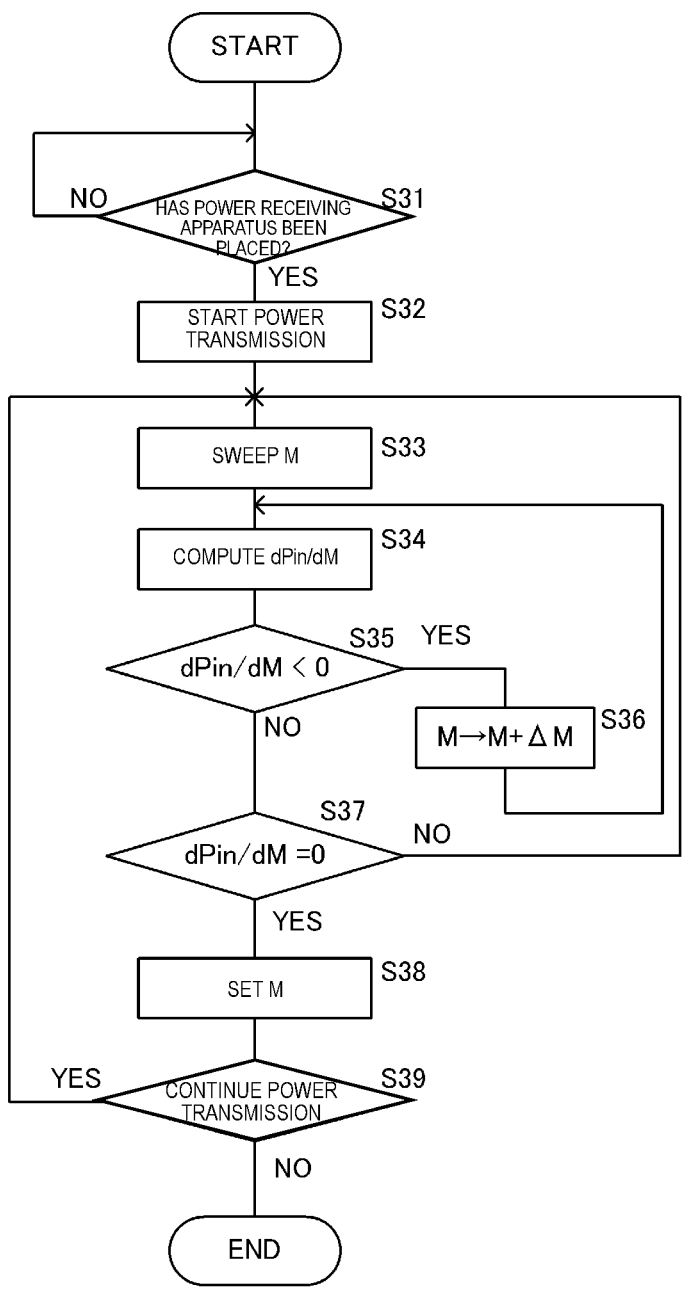
FIG. 10 is a flowchart illustrating another operation of the control section.

FIG. 10 is a flowchart illustrating another operation of the control section 14. In this example, the control section 14 sweeps the transformation ratio M as long as the transformation ratio M does not become too low. As described previously with reference to FIG. 4, when the transformation ratio M becomes small, the input power Pin is markedly increased. This leads to the decrease in power transmission efficiency and the unstable operation of the piezoelectric transformer 24. In order to prevent this from happening, when the transformation ratio M is swept, the transformation ratio M can be swept within a predetermined range so as not to make the input power Pin too high.

The control section 14 determines whether the power receiving apparatus 201 has been placed on the power transmission apparatus 101 (step S31). When the control section 14 does not detect the placement of the power receiving apparatus 201 (No in step S31), the control section 14 can repeatedly perform the processing of step S31. When the control section 14 detects the placement of the power receiving apparatus 201 (Yes in step S31), the control section 14 starts power transmission (step S32).

The voltage conversion unit 146 sweeps the transformation ratio M (step S33). The computation unit 145 computes dPin/dM (step S34) and determines whether dPin/dM<0 is satisfied (step S35). When dPin/dM<0 is satisfied, the transformation ratio M becomes small. As described previously, the decrease in the transformation ratio M leads to the significant increase in the input power Pin. In this case, the operation of the piezoelectric transformer 24 becomes unstable. Accordingly, when dPin/dM<0 is satisfied (Yes in step S35), the voltage conversion unit 146 increases the transformation ratio M (step S36) and the computation unit 145 computes dPin/dM using the increased transformation ratio M (step S34).

When dPin/dM<0 is not satisfied (No in step S35), the computation unit 145 determines whether dPin/dM=0 is satisfied (step S37). When dPin/dM=0 is not satisfied (No in step S37), the voltage conversion unit 146 sweeps the transformation ratio M again since the input power Pin is not a minimum (step S33).

When dPin/dM=0 is satisfied (Yes in step S37), the input power Pin is a minimum. The voltage conversion unit 146 sets the transformation ratio M with which the input power Pin becomes a minimum as a control parameter for the step-up/down circuit 12 (step S38). The control section 14 determines whether to continue power transmission (step S39). When it is determined that power transmission is to be continued (Yes in step S39), the control section 14 performs processing of step S33. In this case, as described previously with reference to FIG. 8, the input power Pin may be monitored, it may be determined whether ΔPin is within the range of the allowable variation amount $P_{TH}$, and the adjustment of the transformation ratio M may be performed on the basis of a result of the determination. When it is determined that power transmission is not to be continued (No in step S39), the control section 14 ends this process.

Through the operation illustrated in FIG. 10, it is possible to efficiently keep power transmission efficiency high without the occurrence of defects in the piezoelectric transformer 24.

Figure 11:
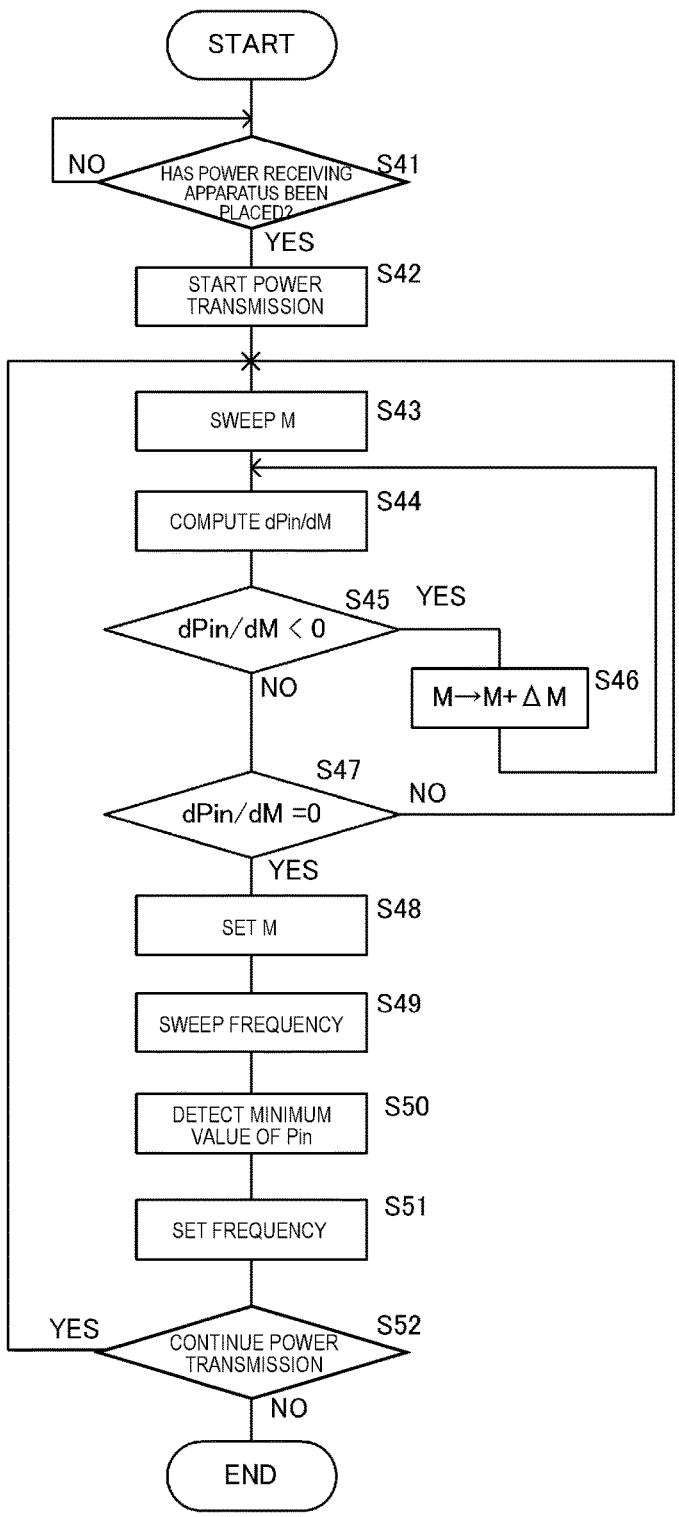
FIG. 11 is a flowchart illustrating another operation of the control section.

FIG. 11 is a flowchart illustrating another operation of the control section 14. In this example, the input power Pin is minimized not only by adjusting the transformation ratio M but also by changing a drive frequency so as to improve power transmission efficiency.

Since the process from step S41 to step S48 illustrated in FIG. 11 is the same as the process from step S31 to step S38 illustrated in FIG. 10, and the description thereof will be therefore omitted.

In step S49, the frequency setting unit 141 performs PWM control upon the switching elements Q1 to Q4 in the inverter circuit 13 to sweep the frequency of the output voltage of the inverter circuit 13 (step S49). Each time frequency sweep is performed, the input current Iin and the input voltage Vin are detected. The computation unit 145 detects the minimum value of the input power Pin (step S50). The frequency setting unit 141 sets a frequency at which the input power Pin becomes a minimum as a drive frequency and controls the inverter circuit 13 (step S51).

The control section 14 determines whether to continue power transmission (step S52). When it is determined that power transmission is to be continued (Yes in step S52), the control section 14 performs processing of step S43. When it is determined that power transmission is not to be continued (No in step S52), the control section 14 ends this process.

In this exemplary embodiment, the input power Pin is minimized not only by adjusting the transformation ratio M but also by adjusting a frequency. The resonance frequency of the piezoelectric transformer 24 sometimes deviates from the drive frequency. In this case, transmission efficiency decreases. In order to prevent this from happening, in this example, the adjustment of a frequency is performed for the minimization of the input power Pin. As a result, in a case where the piezoelectric transformer 24 is used, high efficiency is achieved.

In this embodiment, the minimum value of the input power Pin is detected by sweeping the transformation ratio M. However, the minimum value of the input power Pin may be detected by changing the on-duty ratio of each of the switching elements Q1 to Q4 in the inverter circuit 13. Alternatively, the minimum value of the input power Pin may be detected by phase-shift driving and pulse density modulation driving.

Figure 12:
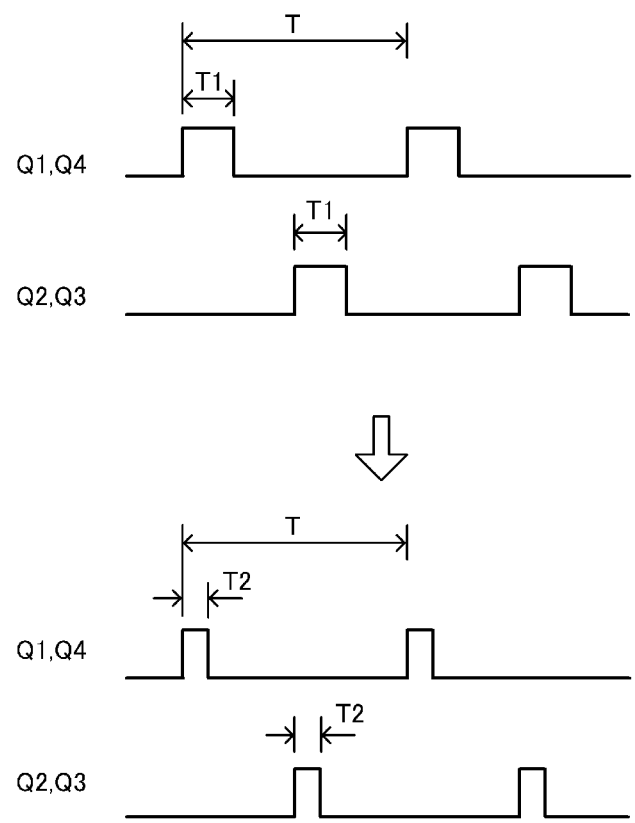
FIG. 12 is a diagram illustrating the pulse waveform of a gate signal of each switching element in an inverter circuit.

FIG. 12 is a diagram illustrating the pulse waveform of a gate signal of each of the switching elements Q1 to Q4 in the inverter circuit 13. FIG. 12 illustrates pulse waves before and after the change in an on-duty ratio. The frequency setting unit 141 changes an ON period T1 of the gate signal of each of the switching elements Q1 to Q4 to an ON period T2 (<T1) without changing a period T and performs PWM control upon the inverter circuit 13. Subsequently, the changed input current Iin and the changed input voltage Vin are detected and it is determined whether the input power Pin is a minimum. This processing is repeatedly performed to detect an on-duty ratio with which the input power Pin becomes a minimum. The frequency setting unit 141 controls the inverter circuit 13 with the detected on-duty ratio to perform power transmission. In this case, high efficiency can also be achieved. In a case where an on-duty ratio is changed, the step-up/down circuit 12 does not necessarily have to be disposed. In this case, the frequency setting unit 141 corresponds to an "output voltage change unit" according to the present invention.

In this embodiment, the transformation ratio M is swept for the minimization of the input power Pin. Here, the input voltage Vin supplied from the direct-current power source 11 to the step-up/down circuit 12 is constant. Accordingly, the transformation ratio M may be swept for the minimization of the input current Iin. In this case, since there is no need to calculate input power from an input current and an input voltage, computation processing can be simplified.

In this embodiment, the power transmission apparatus 101 includes the step-up/down circuit 12 for stepping up or down a direct voltage supplied from a direct-current power source. However, in accordance with the specifications of the direct-current power source, only one of a step-down circuit for performing only step-down of a direct voltage supplied from the direct-current power source and a step-up circuit for performing only step-up of the direct voltage may be disposed.

Second Embodiment

In the second embodiment, in order to respond to an exemplary case where the degree of coupling between a power transmission apparatus and a power receiving apparatus is less than an assumed value and the load circuit RL cannot normally operate because of the lack of a voltage input thereinto, it is desired that the power receiving apparatus 201 have a function of transmitting an error signal to the power transmission apparatus 101.

Figure 13:
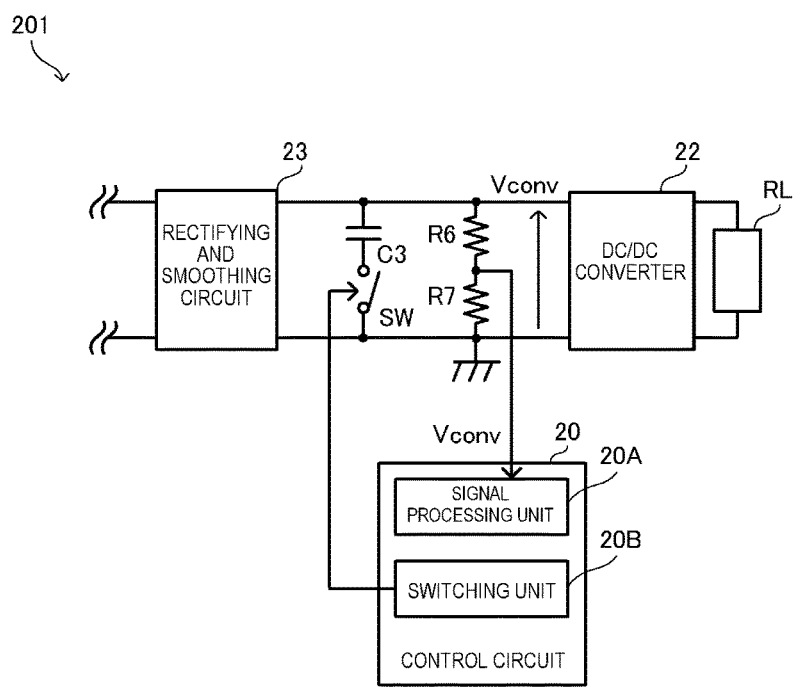
FIG. 13 is a diagram illustrating a part of a circuit in a power receiving apparatus according to a second embodiment.

FIG. 13 is a diagram illustrating a part of a circuit in the power receiving apparatus 201 according to the second embodiment. In the power receiving apparatus 201, a series circuit of a capacitor C3 and a switch SW is connected to the input side of the DC/DC converter 22 and resistors R6 and R7 are connected to the input side of the DC/DC converter 22 as a detection circuit for detecting an input voltage Vconv to be input into the DC/DC converter 22.

The capacitor C3 and the switch SW correspond to an "error signal transmission circuit" according to the present invention. The resistors R6 and R7 correspond to an "input voltage detection circuit" according to the present invention.

The power receiving apparatus 201 includes the control circuit 20. The control circuit 20 has functions of a signal processing unit 20A and a switching unit 20B. The signal processing unit 20A detects the input voltage Vconv by detecting a voltage divided by the resistors R6 and R7 and determines whether the input voltage Vconv is less than a threshold value. When the input voltage Vconv is less than the threshold value, the signal processing unit 20A determines that the DC/DC converter 22 does not normally operate because of the lack of a voltage. At that time, the switching unit 20B performs PWM control upon the switch SW to transmit binary data to the power transmission apparatus 101.

When the switch SW is turned on, the resonance point of the power receiving apparatus 201 is changed. Accordingly, in the power transmission apparatus 101, the input current Iin is changed. The power transmission apparatus 101 therefore reads the modulation signal of binary data transmitted from the power receiving apparatus 201 on the basis of the change in the input current Iin. As a result, the power transmission apparatus 101 can receive an error signal from the power receiving apparatus 201.

When the power transmission apparatus 101 receives an error signal from the power receiving apparatus 201, the power transmission apparatus 101, for example, increases input power thereof to prevent the occurrence of lack of a voltage in the power receiving apparatus 201.

A method of transmitting an error signal from the power receiving apparatus 201 to the power transmission apparatus 101 may be the above-described load modulation method or may be performed with another communication tool.

A lower limit may be set to the input voltage Vconv and the operation of the DC/DC converter 22 may be stopped when the input voltage Vconv is below the lower limit. In this case, power transmission is reset. However, by increasing the input power Pin in the power transmission apparatus 101 at the next activation, a normal operation can be achieved.

Third Embodiment

Figure 14:
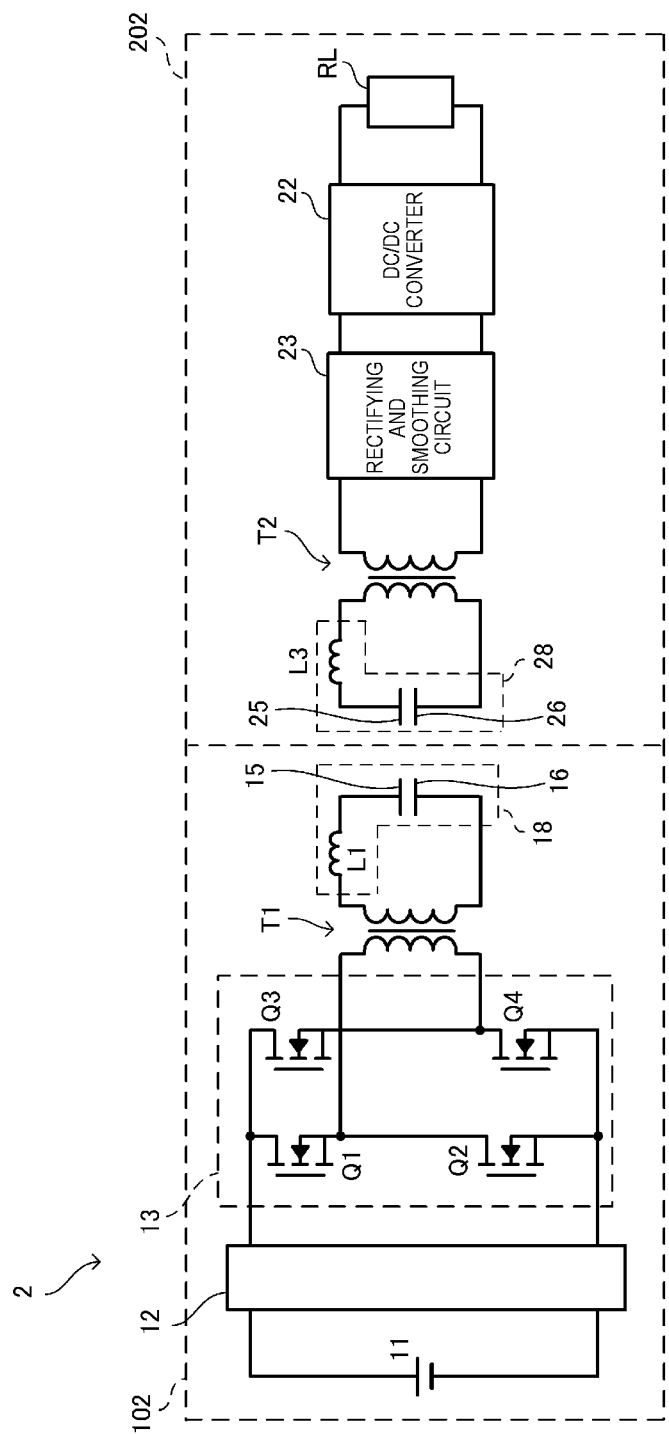
FIG. 14 is a circuit diagram of a power transmission system according to a third embodiment.

FIG. 14 is a circuit diagram of a power transmission system 2 according to the third embodiment. This embodiment differs from the first embodiment in that each of a power transmission apparatus 102 and a power receiving apparatus 202 includes a series resonance circuit and the power receiving apparatus 202 does not include a piezoelectric transformer and includes a wire-wound step-down transformer T2.

In this example, in the power transmission apparatus 102, an inductor L1 is connected to the secondary winding of the step-up transformer T1. The inductor L1 forms a series resonance circuit 18 along with a capacitance between the active electrode 15 and the passive electrode 16.

In the power receiving apparatus 202, the primary winding of the step-down transformer T2 is connected to the active electrode 25 and the passive electrode 26. The secondary winding of the step-down transformer T2 is connected to the rectifying and smoothing circuit 23. An inductor L3 is connected between the primary winding of the step-down transformer T2 and the active electrode 25. The inductor L3 forms a series resonance circuit 28 along with a capacitance between the active electrode 25 and the passive electrode 26. A constant is set so that the series resonance circuit 28 and the series resonance circuit 18 in the power transmission apparatus 102 have the same resonance frequency.

Like in the first embodiment, in the power transmission system 2, the transformation ratio M is swept, the transformation ratio M with which the input power Pin becomes a minimum is set as a control parameter for the step-up/down circuit 12, and power transmission is performed. As a result, power transmission efficiency can be kept high.

Fourth Embodiment

Figure 15:
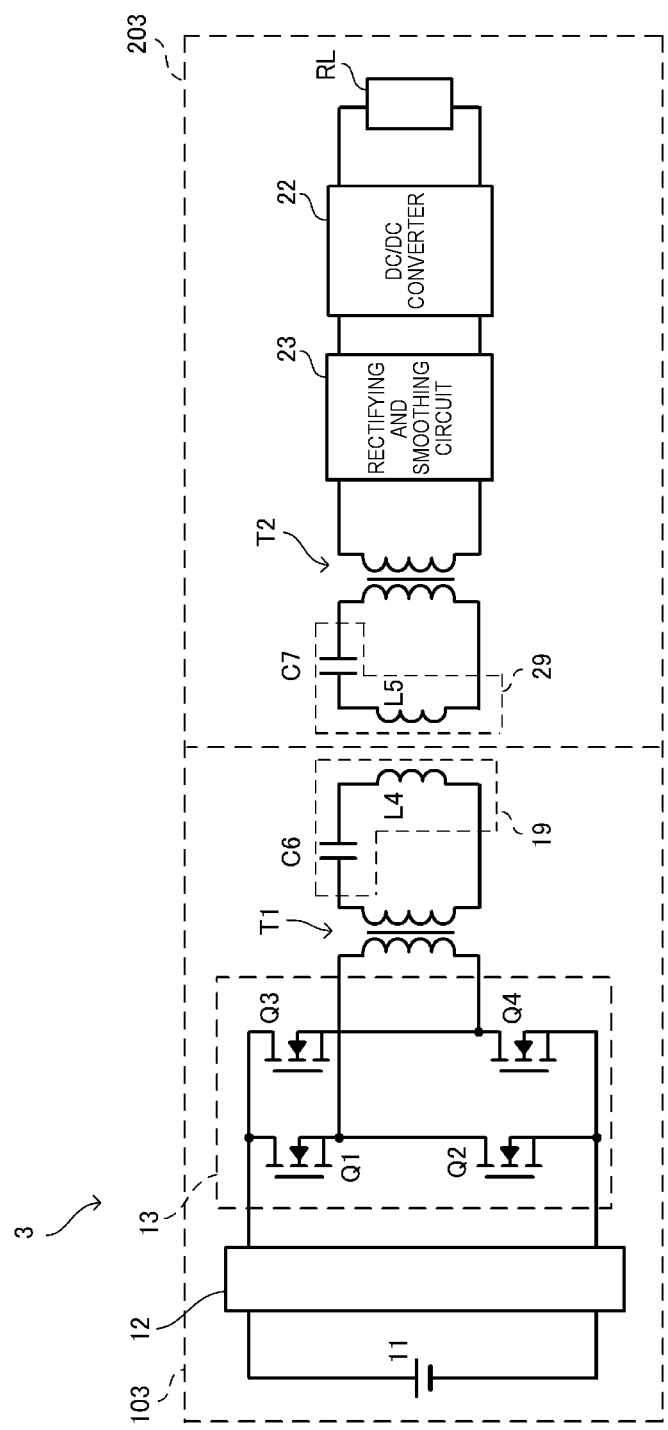
FIG. 15 is a circuit diagram of a power transmission system according to a fourth embodiment.

FIG. 15 is a circuit diagram of a power transmission system 3 according to the fourth embodiment. In this example, when the magnetic field coupling between a power transmission apparatus 103 and a power receiving apparatus 203 is provided, power is transmitted from the power transmission apparatus 103 to the power receiving apparatus 203.

Like in the first embodiment, the power transmission apparatus 103 includes the direct-current power source 11, the step-up/down circuit 12, the inverter circuit 13, and the step-up transformer T1. An inductor L4 used for the magnetic field coupling is connected to the secondary winding of the step-up transformer T1. The inductor L4 corresponds to the "transmission-side coupling component" according to the present invention.

A capacitor C6 is connected between the secondary winding of the step-up transformer T1 and the inductor L4. The capacitor C6 forms a series resonance circuit 19 along with the inductor L4. The series resonance circuit 19 corresponds to the "transmission-side resonance circuit" according to the present invention.

The power receiving apparatus 203 includes an inductor L5 that is coupled to the inductor L4 by magnetic field coupling. The inductor L5 corresponds to the "receiving-side coupling component" according to the present invention. A capacitor C7 is connected to the inductor L5. The inductor L5 and the capacitor C7 form a series resonance circuit 29. A constant is set so that the series resonance circuit 29 and the series resonance circuit 19 have the same resonance frequency. The series resonance circuit 29 corresponds to the "receiving-side resonance circuit" according to the present invention.

The series resonance circuit 29 is connected to the primary winding of the step-down transformer T2. Like in the third embodiment, the rectifying and smoothing circuit 23, the DC/DC converter 22, and the load circuit RL are connected to the secondary winding of the step-down transformer T2 in this order.

Like in the first embodiment, in the power transmission system 3, the transformation ratio M is swept, the transformation ratio M with which the input power Pin becomes a minimum is set as a control parameter for the step-up/down circuit 12, and power transmission is performed. As a result, power transmission efficiency can be kept high.

REFERENCE SIGNS LIST 1, 2, 3 power transmission system
11 direct-current power source
12 step-up/down circuit
13 inverter circuit
14 control section
15, 25 active electrode
16, 26 passive electrode
17 parallel resonance circuit
18 series resonance circuit
19 series resonance circuit
20 control circuit
20A signal processing unit
20B switching unit
22 DC/DC converter
23 rectifying and smoothing circuit
24 piezoelectric transformer
28, 29 series resonance circuit
101, 102, 103 power transmission apparatus
141 frequency setting unit
142 input current detection unit
143 input voltage detection unit
144 output voltage detection unit
145 computation unit
146 voltage conversion unit
201, 202, 203 power receiving apparatus
241 series resonance circuit
242 parallel resonance circuit

The invention claimed is:

1. A power transmission apparatus for wirelessly transmitting power to a power receiving apparatus that includes at least one receiving-side coupling component, a receiving-side resonance circuit, and an output circuit configured to convert a voltage induced by the at least one receiving-side coupling component into a voltage of a predetermined value and output the converted voltage to a load, the power transmission apparatus, comprising:
   at least one transmission-side coupling component;
   a transmission-side resonance circuit that is coupled to the at least one transmission-side coupling component or that includes the at least one transmission-side coupling component;
   a power conversion circuit configured to convert a direct voltage into an alternating voltage and output the alternating voltage to the transmission-side resonance circuit; and
   a controller that sets an output power of the power conversion circuit, the controller being configured to:
      set a frequency of the alternating voltage to a frequency determined based on a resonance frequency of the transmission-side resonance circuit and a resonance frequency of the receiving-side resonance circuit,
      change the output power of the power conversion circuit at the set frequency of the alternating voltage,
      detect an input power of the power conversion circuit upon a detected change of the output power of the power conversion circuit,
      determine a minimum value of the input power, and
      set the output power of the power conversion circuit based on the determined input power having the minimum value,
   wherein the power transmission apparatus wirelessly transmits power to the power receiving apparatus by one of electric field coupling and magnetic field coupling between the transmission-side coupling components and the receiving-side coupling components.

2. The power transmission apparatus according to claim 1, wherein, the receiving-side resonance circuit of the power receiving apparatus is configured to resonate at the same resonance frequency as the transmission-side resonance circuit of the power transmitting apparatus.

3. The power transmission apparatus according to claim 1, wherein, when a constant voltage is input into the power conversion circuit, the controller detects an input current of the power conversion circuit and determines a minimum value of the input current.

4. The power transmission apparatus according to claim 1, wherein the power conversion circuit includes a voltage transforming circuit configured to step-up, step-down, or step-up and step-down the direct voltage and an inverter circuit that is connected to the voltage transforming circuit and is configured to convert the stepped-up or stepped-down direct voltage into the alternating voltage.

5. The power transmission apparatus according to claim 4, wherein the controller is configured to drive the voltage transforming circuit for step-up or step-down of the direct voltage and control the inverter circuit.

6. The power transmission apparatus according to claim 4,
    wherein the power transmission apparatus further includes a voltage detection circuit configured to detect an input voltage and an output voltage of the voltage transforming circuit, and
    wherein the controller is further configured to change a transformation ratio between the input voltage and the output voltage of the voltage transforming circuit.

7. The power transmission apparatus according to claim 6, wherein, when the controller repeatedly sets the output power of the power conversion circuit, the controller is further configured to calculates input power from the input voltage and an input current of the voltage transforming circuit at a time when the output power of the power conversion circuit was previously set, to set an initial value based on a square root of the input power for the transformation ratio, and to change the transformation ratio from the initial value.

8. The power transmission apparatus according to claim 6, wherein the controller changes an on-duty ratio or a pulse density of the inverter circuit.

9. A power transmission system comprising:
    a power transmitting apparatus including:
        at least one transmission-side coupling component,
            a transmission-side resonance circuit that is coupled to or that includes the at least one transmission-side coupling component, and
            a power conversion circuit configured to convert a direct voltage into an alternating voltage and output the alternating voltage to the transmission-side resonance circuit; and
    a power receiving apparatus including:
        at least one receiving-side coupling component,
        a receiving-side resonance circuit that is coupled to or that includes the at least one receiving-side coupling component and that is configured to resonate at the same resonance frequency as the transmission-side resonance circuit of the power transmitting apparatus,
        an output circuit configured to convert a voltage induced by the receiving-side coupling components into a voltage of a predetermined value and output the converted voltage to a load,
    wherein the power transmission apparatus further comprises a controller that sets an output power of the power conversion circuit, the controller being configured to:
        set a frequency of the alternating voltage to a frequency determined based on a resonance frequency of the transmission-side resonance circuit and a resonance frequency of the receiving-side resonance circuit,
        change the output power of the power conversion circuit at the set frequency of the alternating voltage,
        detect an input power of the power conversion circuit upon a detected change of the output power of the power conversion circuit,
        determine a minimum value of the input power, and
        set the output power of the power conversion circuit based on the determined input power having the minimum value,
    wherein the power transmission apparatus wirelessly transmits power to the power receiving apparatus by one of electric field coupling and magnetic field coupling between the transmission-side coupling components and the receiving-side coupling components.

10. The power transmission system according to claim 9, wherein the power receiving apparatus further includes an input voltage detection circuit configured to detect an input voltage of the output circuit and an error signal transmission circuit configured to transmit an error signal to the power transmission apparatus when the input voltage detected by the input voltage detection circuit is less than a threshold value.

11. The power transmission system according to claim 9, wherein the at least one transmission-side coupling component of the power transmitting apparatus comprises a first active electrode and a first passive electrode and the at least one receiving-side coupling component of the power receiving apparatus comprises a second active electrode and a second passive electrode.

12. A method for wirelessly transmitting power from a power transmission apparatus to a power receiving apparatus, where the power transmission apparatus includes at least one transmission-side coupling component, a transmission-side resonance circuit, and a power conversion circuit that converts a direct voltage into an alternating voltage and outputs the alternating voltage to the transmission-side resonance circuit, and the power receiving apparatus includes at least one receiving-side coupling component, a receiving-side resonance circuit, and an output circuit that converts a voltage induced by the receiving-side coupling components into a voltage of a predetermined value and outputs the converted voltage to a load, the power transmission apparatus, the method comprising:
    setting a frequency of the alternating voltage to a frequency determined based on a resonance frequency of the transmission-side resonance circuit and a resonance frequency of the receiving-side resonance circuit;
    changing an output power of the power conversion circuit at the set frequency of the alternating voltage;
    detecting an input power of the power conversion circuit upon a detected change of the output power of the power conversion circuit;
    determining a minimum value of the input power; and
    setting the output power of the power conversion circuit based on the determined input power having the minimum value.

13. The method according to claim 12, further comprising:
    detecting an input current of the power conversion circuit when a constant voltage is input into the power conversion circuit; and
    determining a minimum value of the input current.

14. The method according to claim 12, further comprising:
    performing, by a voltage transforming circuit, at least one of stepping-up, stepping-down, or stepping-up and stepping-down the direct voltage; and converting, by an inverter circuit, the stepped-up or stepped-down direct voltage into the alternating voltage.

15. The method according to claim 14, further comprising driving the voltage transforming circuit for step-up or step-down of the direct voltage and controlling the inverter circuit.

16. The method according to claim 14, further comprising:
   detecting, by a voltage detection circuit, an input voltage and an output voltage of the voltage transforming circuit; and
   changing a transformation ratio between the input voltage and the output voltage of the voltage transforming circuit.

17. The method according to claim 16, wherein, when the output power of the power conversion circuit is repeatedly set, the method further comprises calculating an input power from the input voltage and an input current of the voltage transforming circuit at a time when the output power of the power conversion circuit was previously set.

18. The method according to claim 17, further comprising:
   setting an initial value based on a square root of the input power for the transformation ratio, and
   changing the transformation ratio from the initial value.

19. The method according to claim 16, further comprising changing an on-duty ratio or a pulse density of the inverter circuit.

20. The method according to claim 12, further comprising:
   detecting, by an input voltage detection circuit of the power receiving apparatus, an input voltage of the output circuit; and
   transmitting, by an error signal transmission circuit of the power receiving apparatus, an error signal to the power transmission apparatus when the input voltage detected by the input voltage detection circuit is less than a threshold value.

* * * * *